(12) United States Patent
Fischer

(10) Patent No.: US 6,513,782 B2
(45) Date of Patent: Feb. 4, 2003

(54) TRANSOM SAVER DEVICE

(76) Inventor: David J. Fischer, 37829 Country La., Oconomowoc, WI (US) 53066

( * ) Notice: Subject to any disclaimer, the term of this patent is extended or adjusted under 35 U.S.C. 154(b) by 0 days.

(21) Appl. No.: 09/765,701

(22) Filed: Jan. 22, 2001

(65) Prior Publication Data

US 2002/0098752 A1 Jul. 25, 2002

(51) Int. Cl.$^7$ .................................................. B63H 5/20
(52) U.S. Cl. ........................................ 248/640; 440/53
(58) Field of Search ......................... 248/640; 440/53, 440/55, 113

(56) References Cited

U.S. PATENT DOCUMENTS

| | | | |
|---|---|---|---|
| 5,041,032 A | 8/1991 | Makihara et al. | 440/53 |
| 5,293,832 A | 3/1994 | Potter, Jr. | 114/364 |
| 5,525,082 A | 6/1996 | Lee et al. | 440/53 |
| 5,683,214 A | 11/1997 | Jeffreys | 410/77 |
| 5,876,166 A | 3/1999 | Hyslop | 410/77 |

*Primary Examiner*—Sherman Basinger
(74) *Attorney, Agent, or Firm*—Willis B. Swartwout, III

(57) ABSTRACT

A transom saver and transom saver buddy for use in connection with water craft provided with an outboard motor or stern drive apparatus including transom saver structure having an elongated member adapted to be secured at one end to a trailer for the craft and at the other end to engage the motor or stern drive shank and provided with bracket structure adapted to be secured to the trailer and receive for temporary storage the elongated member which is bent to form an obtuse angle.

5 Claims, 2 Drawing Sheets

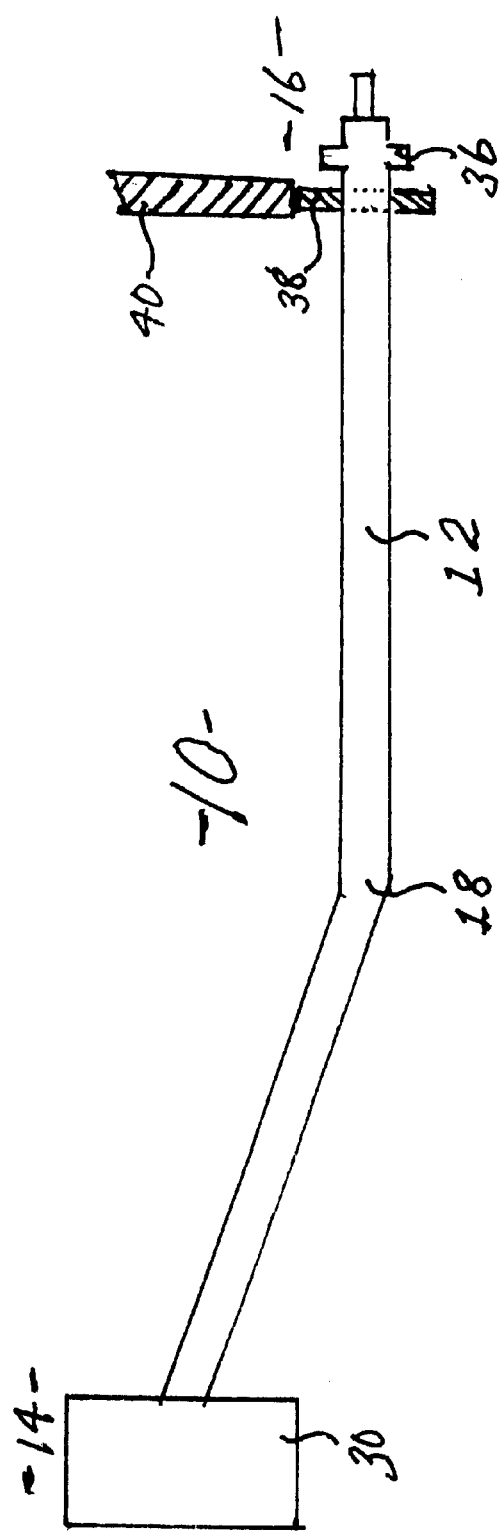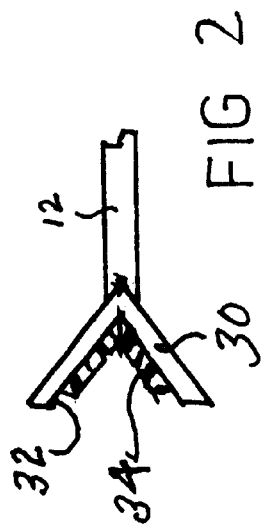
FIG 1
FIG 2

TRANSOM SAVER DEVICE

BACKGROUND OF THE INVENTION

The present invention relates to transom saving devices for boat transoms, and more particularly to devices for securing the transoms of trailored boats against damage while in transit.

In the past boats which have been in transit on trailers of the type used for boats have been secured to the trailer by a strap which can be snugged and is located generally amidships of the boat and thus of the trailer and also boats have been secured to the trailer at the prow by virtue of an eye on the prow of the boat and a line on the winch with a hook. In some cases there have even been hooking devices to connect the prow eye to the trailer front.

In any event the structure of the past has left the stern of the boat free to bounce relative to the back of the trailer and when a relatively heavy outboard motor is hanging on the back transom of the boat the motor could be damaged by such bouncing action or more often the transom itself could be cracked or broken through.

SUMMARY OF THE INVENTION

The present invention proposes to overcome the problems of the prior art by providing a transporting brace adapted to receive the motor shank when in place between the trailer and the motor and further adapted to be stored on the trailer frame from the back when the motor is released for launching.

It is an object of the present invention to provide structure of the character described including a bar adapted to be attached at one end to the trailer and at the other end to receive an engine shank.

It is another object of the present invention to provide a device of the character above described wherein a clamping member is included attached to the trailer frame to receive and hold against loss, the bar previously described when not in use.

Various other and further objects and advantages of the present invention will become apparent as this description proceeds to one skilled in the art as will various modifications and changes which can be made to the present invention without departing from the spirit thereof. These various objects, advantages, modifications and changes are intended to be covered by the scope of the appended claims.

DESCRIPTION OF THE DRAWINGS

FIG. 1 is a vertical plan view of structure of the present invention with the transom saver in saving position;

FIG. 2 is a top plan view of the motor shank engaging portion of the structure in FIG. 1;

DESCRIPTION OF A PREFERRED EMBODIMENT

Figure 3:
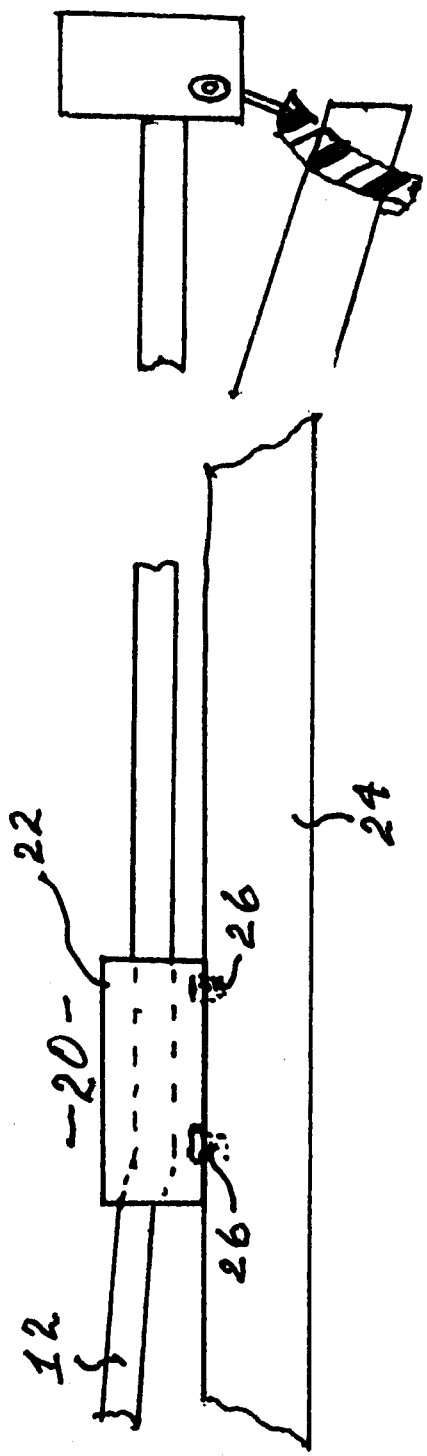
FIG. 3 is a vertical plan view of the transom saver structure engaged with the transom saver buddy structure for storage of the unit.
Figure 4:
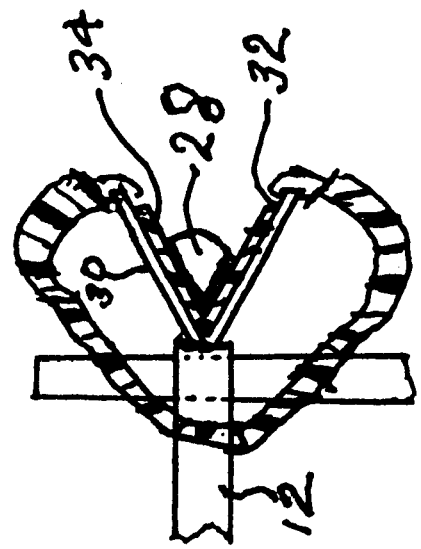
FIG. 4 is a top plan view of a portion of the structure shown in FIG. 3 showing the fastening structure.

Referring now to the drawings and particularly to FIGS. 1 and 2 thereof, a transom saver device is disclosed and generally identified by the numeral 10. Transom saver 10 is an elongated metal bar member or tube 12, provided at one end with motor shank engaging structure generally identified by the numeral 14, and at the other end with trailer engaging structure generally identified by the number 16. It should be noted that tube 12 is provided, intermediate its ends with a bend area 18 which facilitates the use of the saver in a manner which will hereinafter be described.

A transom saver buddy is generally identified by the number 20 and constitutes a bracket 22 which can be selectively attached to a trailer frame member 24 by any suitable means such as by bolts 26, welding or other attachment means.

Outboard motors and drive units that protrude from a transom of a boat are provided with downwardly projecting shank structure 28 which can be moved reciprocally through a vertical arc generally perpendicular to the boat transom either manually or by electrical power. This is for the purpose of preventing the prop from dragging on the bottom or on the road during towing. Unsupported the shank 28 can bounce around and be damaged or cause serious damage to the transom to which it is attached while towing is being done. To prevent this from happening, one end of bar or tube 12 is provided with a V-shaped receptacle 30 welded or otherwise suitably attached to bar or tube 12 such that the point of the receptacle 30 is toward the bar 12 and the inner side 32 of the receptacle faces the shank 28. The inner side 32 may be provided with a cushioning pad 34 to prevent scratching and damage to the shank 28. A rubber or composition type "bungy" cord is used to solidly attach the shank 28 to receptacle 30 and bar or tube 12.

The end of bar or tube 12 remote from receptacle 30 is provided with a pin 36 fixedly disposed perpendicular to the bar or tube 12 adjacent the remote end thereof for securing the bar or tube 12 to a aperture 38 provided in a flange 40 on the trailer frame. Attachment of the bar 12 to the trailer could be made in any other suitable fashion which permits easy and rapid detachment but in some cases the flange is already on the trailer, placed there by the trailer manufacturer.

When the boat is put in the water, the operator removes the bar or tube 12 and its shank engaging structure 30, 32 and 34 by tilting the shank 14 and then turning tube or bar 12 to free it from aperture 38 of flange 40, slides tube or bar 12 into bracket 22 taking advantage of the bend area 18 and uses the "bungy" cord to secure the shank engaging structure 30,32 and 34 to frame 24 against loss while the trailer is parked.

It is thus clear how the transom saver 10 and the transom saver buddy 20 cooperate to accomplish the objects of the invention as previously set forth.

I claim:

1. Water craft transom saving structure comprising;

a.) an elongated transom saver member having motor shank engaging structure at one end, b.) water craft trailer engaging structure at the end of said elongated transom saver member remote from said one end,
c.) a bend area on said elongated transom saver member intermediate said ends, and
d.) bracket means adapted to be secured to a water craft trailer forming a passageway to receive and store said member by wedging said bend area into said passageway in said bracket.

2. The structure as set forth in claim 1, wherein said intermediate bend area is bent to form said elongated member into an obtuse angle.

3. The structure as set forth in claim 1, wherein said shank engaging structure is a generally V-shaped receptacle adapted to receive a motor shank.

4. The structure as set forth in claim 3, wherein a shank contacting face of said V-shaped receptacle is provided with a cushioning pad.

5. The structure as set forth in claim 1, wherein said trailer engaging structure includes a flange having an aperture on the trailer's frame and a pin on said elongated member end remote from said shank engaging structure.

* * * * *